US007606851B2

(12) United States Patent
Pierce et al.

(10) Patent No.: US 7,606,851 B2
(45) Date of Patent: Oct. 20, 2009

(54) CORRELATOR HAVING USER-DEFINED PROCESSING

(75) Inventors: David Pierce, Wheaton, IL (US); Michael Hammer, Westchester, IL (US)

(73) Assignee: Lattice Semiconductor Corporation, Hillsboro, OR (US)

( * ) Notice: Subject to any disclaimer, the term of this patent is extended or adjusted under 35 U.S.C. 154(b) by 842 days.

(21) Appl. No.: 11/202,149

(22) Filed: Aug. 10, 2005

(65) Prior Publication Data

US 2007/0038692 A1    Feb. 15, 2007

(51) Int. Cl.
*G06F 17/15* (2006.01)

(52) U.S. Cl. .................................................. 708/422

(58) Field of Classification Search ........................ None
See application file for complete search history.

(56) References Cited

U.S. PATENT DOCUMENTS

| 4,612,625 | A | 9/1986 | Bertrand | |
|---|---|---|---|---|
| 5,349,550 | A | 9/1994 | Gage | |
| 5,422,860 | A | 6/1995 | Bradley | |
| 6,963,890 | B2 * | 11/2005 | Dutta et al. | 708/319 |
| 2002/0010727 | A1 | 1/2002 | Hughes | |
| 2003/0200241 | A1 * | 10/2003 | Liang et al. | 708/300 |
| 2005/0080831 | A1 * | 4/2005 | Pickerd et al. | 708/300 |
| 2005/0251542 | A1 * | 11/2005 | Hennedy et al. | 708/300 |
| 2006/0010186 | A1 * | 1/2006 | Best et al. | 708/300 |

OTHER PUBLICATIONS

Altera Corporation, Binary Pattern Correlator Megafunction, Solution Brief 18, Apr. 1997 ver. 1.
Logicore Bit Correlator v 3.0, Oct. 4, 2001.
PCT International Search Report and Written Opinion of ISA.

* cited by examiner

*Primary Examiner*—David H Malzahn

(57) ABSTRACT

In one embodiment of the invention, a circuit may include and/or involve a correlator, a programmable fabric, and logic to enable selection of one of default processing logic and alternate processing logic to process corresponding data and coefficient values of the correlator.

8 Claims, 4 Drawing Sheets

CORRELATOR HAVING USER-DEFINED PROCESSING

TECHNICAL FIELD

The present disclosure relates to correlation circuits and techniques.

BACKGROUND

Traditional bit correlators implement operations according to the equation $$r_k = \sum_{i=0}^{W-1} d_{i+k} c_i \text{ for } k = 0, 1, 2, \ldots n-1$$

where d are data values, c are corresponding coefficient values, W is the correlation window size (e.g. in data samples), and n is the number of lags or delays applied to the data samples. Correlators are useful in many applications, including digital signal processing.

Design flexibility may be improved by providing capabilities for operations beyond and/or in addition to multiplication of data and corresponding coefficients.

SUMMARY

In one embodiment of the invention, a circuit may include and/or involve a correlator, a programmable fabric, and logic to enable selection of one of default processing logic and alternate processing logic to process corresponding data and coefficient values of the correlator.

BRIEF DESCRIPTION OF THE DRAWINGS

In the drawings, the same reference numbers and acronyms identify elements or acts with the same or similar functionality for ease of understanding and convenience. To easily identify the discussion of any particular element or act, the most significant digit or digits in a reference number refer to the figure number in which that element is first introduced.

DETAILED DESCRIPTION

References to "one embodiment" or "an embodiment" do not necessarily refer to the same embodiment, although they may.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively. Additionally, the words "herein," "above," "below" and words of similar import, when used in this application, refer to this application as a whole and not to any particular portions of this application. When the claims use the word "or" in reference to a list of two or more items, that word covers all of the following interpretations of the word: any of the items in the list, all of the items in the list and any combination of the items in the list.

"Logic" refers to signals and/or information that may be applied to influence the operation of a device. Software, hardware, and firmware are examples of logic. Hardware logic may be embodied in circuits. In general, logic may comprise combinations of software, hardware, and/or firmware.

Correlator With Selectable Processing Logic

Figure 1:
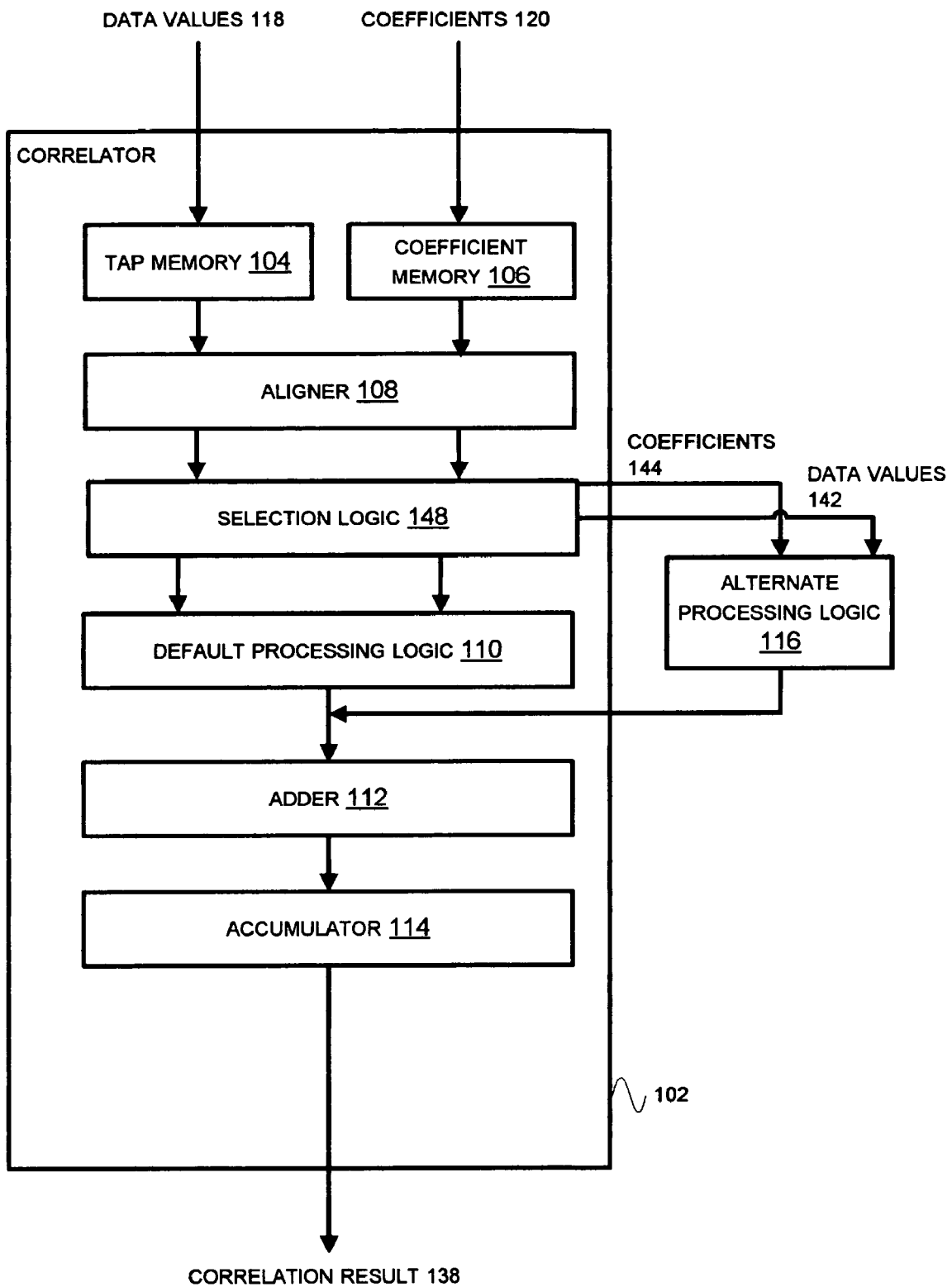
FIG. 1 is a block diagram of an embodiment of a correlator having selectable processing logic.

FIG. 1 is a block diagram of an embodiment of a correlator 102 having selectable processing logic.

The correlator 102 receives data values 118 and coefficients 120 and produces a correlation result 138. In some embodiments, by default, the correlation result 138 involves a summation of results of multiplying the data values 118 and corresponding coefficients 120.

The correlator 102 may comprise a tap memory 104, a coefficient memory 106, an aligner 108, default processing logic 110, selection logic 148, an adder 112, and an accumulator 114.

The tap memory 104 may provide buffered storage of received data 118. The coefficient memory 106 likewise may provide buffered storage of coefficients 120. Corresponding data and coefficient values may have different bit lengths. During a particular processing cycle, the aligner 108 may enable a data value and corresponding coefficient value of different bit lengths to be properly retrieved for processing. Data values 142 and corresponding coefficients 144 may be output from the aligner for further processing.

Alternate processing logic 116 provides for alternative operations involving the data 118 and coefficients 120. Selection of the alternate processing logic 116 enables the correlator 102 to produce a correlation result 138 that is not limited to the default multiplication of data 118 and corresponding coefficients 120. For purposes of this description and the claims which follow, the alternate processing logic 116 may be considered as either part of the correlator 102 or separate from it.

The correlator 102 may include and/or involve selection logic 148 to enable selection of one of default processing logic 110 and alternate processing logic 116. Although illustrated as part of the correlator 102, the selection logic 148 may in some embodiments be external thereto, or a combination of internal and external logic. Data values 118 and corresponding coefficient values 120 may be applied to the default processing logic 110 if the default processing logic 110 is selected, and to the alternate processing logic 116 if the alternate processing logic 116 is selected.

In some embodiments, the selection logic may select either a default data-coefficient multiplier or user-defined processing logic. The user-defined logic may be logic configurable from a programmable fabric, and/or fixed-processing logic having inputs and outputs accessible via the programmable fabric. User-defined alternative logic is discussed in more detail in conjunction with FIG. 4.

The adder/accumulator logic 112/114 (a.k.a. logic to add/accumulate results, also referred to herein as 'summation logic') may add and/or accumulate results of applying either the default processing logic 110 or the alternate processing logic 116. The adder 112 may sum results of processing of the data and coefficient values that can be accomplished in a single pipeline period (e.g. one clock cycle). The accumulator 114 may sum results from the adder 112 over multiple pipeline periods. In some implementations, the adder/accumulator logic 112/114 may accommodate a configurable number of input bits and may thus cooperate with a wide range of alternate processing logic 116.

The correlator 102 may operate in a pipelined fashion, so that timing of completion and/or initiation of various stages is dependent upon timing of completion of other stages. The correlator 102 and/or associated logic may cause selected alternate processing logic 116 to become part of the processing pipeline of the correlator 102. Thus, alternate processing logic 116 may be accommodated involving more or fewer clock cycles than stages of the correlator 102. In some embodiments the time required by the alternate processing logic 116 may even vary from one data/coefficient pair to the next.

Correlation Using Selectable Processing Logic

Figure 2:
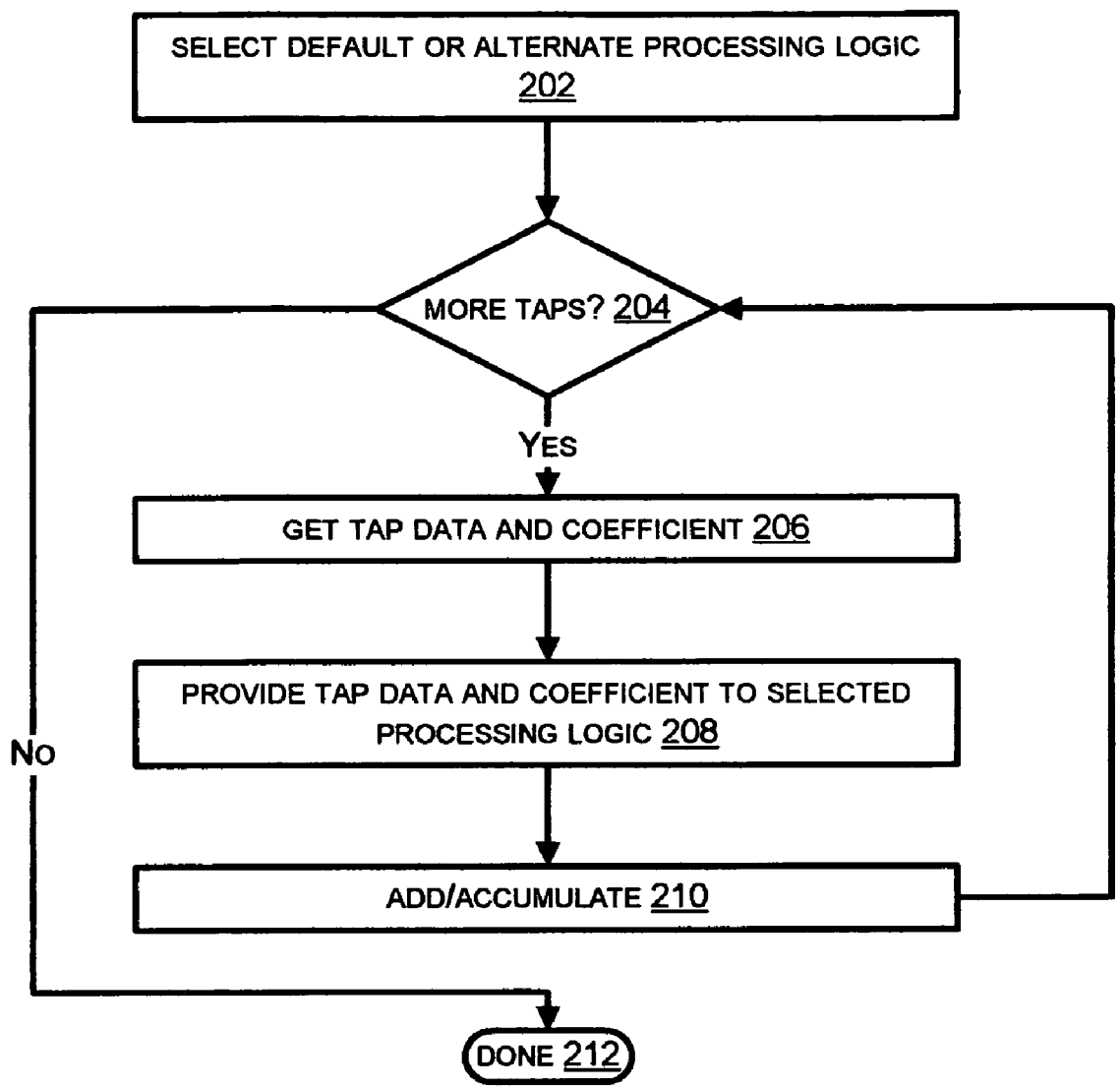
FIG. 2 is a flow chart of an embodiment of a correlation technique involving selectable processing logic.

FIG. 2 is a flow chart of an embodiment of a correlation technique involving selectable processing logic.

At 202 default or alternative processing is selected. Correlation commences at 204. If at 204 there are more data taps (e.g. data values, possibly delayed) to include in the correlation, the next data and corresponding coefficient are retrieved at 206. In some implementations, the data and coefficient may be retrieved from data (tap) and coefficient memory areas, respectively. At 208 the data and coefficient are provided to the selected processing logic. Results of processing the data/coefficient are added/accumulated at 210, and processing continues until there are no more taps to include in the correlation. Processing concludes at 212.

Alternate Processing Logic Including Lookup Table and Coefficient Weights

Figure 3:
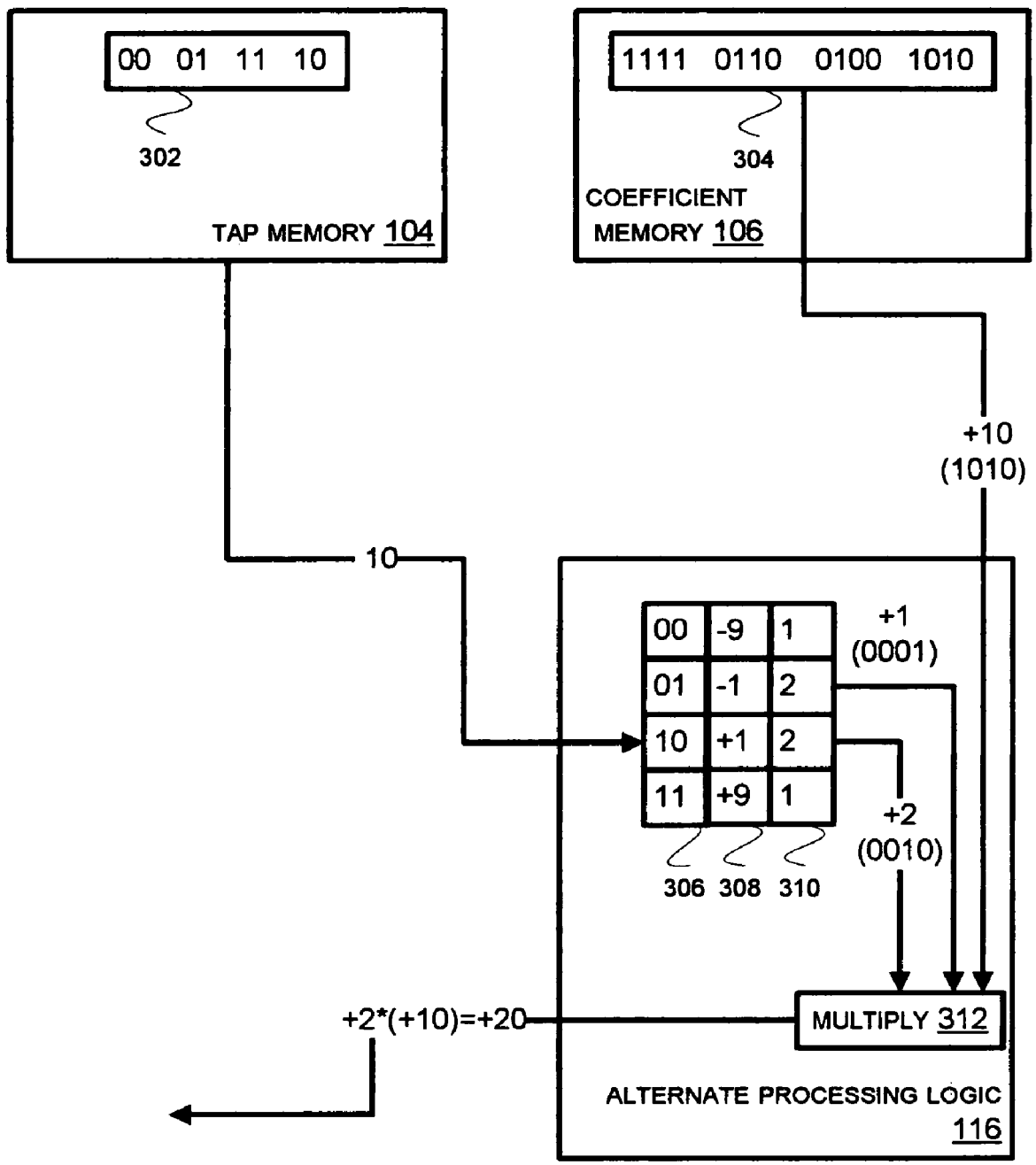
FIG. 3 is a block diagram of an embodiment of alternate processing logic including an association of data codes, data values, and weights.

FIG. 3 is a block diagram of an embodiment of alternate processing logic 116 including an association of data codes 306, data values 308, and coefficient weights 310.

The tap memory 104 in this example includes the binary values 00, 01, 11, and 10 (element 302). The coefficient memory 106 in this example includes the binary values 1111, 0110, 0100, 1010 (element 304). The values in the tap memory 104 are codes representing actual data values.

In some implementations the alternate processing logic 116 may involve logic including at least one association of encoded data values 306 with actual data values 308. This may enable the processing of encoded data, e.g. values representing data values. The alternate processing logic may also or alternatively include and/or involve at least one association of weights and data. This may enable some tap positions and/or data values to carry more weight than others.

The alternate processing logic 116 in this example includes a code table 306 and a table 308 of corresponding data values (shown in decimal for clarity). Thus, a value of 00 (binary) from the tap memory 104 corresponds to a data value of −9, a value of 01 corresponds to a data value of −1, a value of 10 corresponds to a data value of +1, and a value of 11 corresponds to a data value of +9. Thus, although only two bits are used to encode the data values, a dynamic range of data values from −9 to +9 may be accommodated.

The alternate processing logic 116 further includes a table of weights to apply to corresponding data values. Thus, a weight of 1 is applied to data values of −9 and 9, and a weight of 2 is applied to data values of −1 and +1. Depending upon the implementation, weighting may act to increase accuracy, efficiency, dynamic range, and other features of the results.

The alternate processing logic 116 further includes a multiplier 312 to multiply data values, weights, and corresponding coefficients. A single multiplier is shown for the sake of discussion, but those skilled in the art will recognize that two or more multipliers may be employed in certain implementations.

In this example a tap value of 10 (binary) is provided to the processing logic 116. The value 10 is applied to locate associated data value +1 and associated weight +2. The data value and weight are applied to the multiplier, along with the associated coefficient (+10) from coefficient memory 106. The result +20 may be provided from the processing logic 116 back to the correlator 102, or may be applied to other logic for further processing before being returned to the correlator 102.

It may be advantageous, in certain implementations, for the alternate processing logic 116 to include and/or involve logic associating encoded coefficient values with actual coefficient values. In some implementations the alternate processing logic may also involve association of weights and coefficients. In other words, many embodiments are envisioned as being encompassed by the invention, including but not limited to the use of alternate processing logic involving varied uses of lookup tables and weights.

Figure 4:
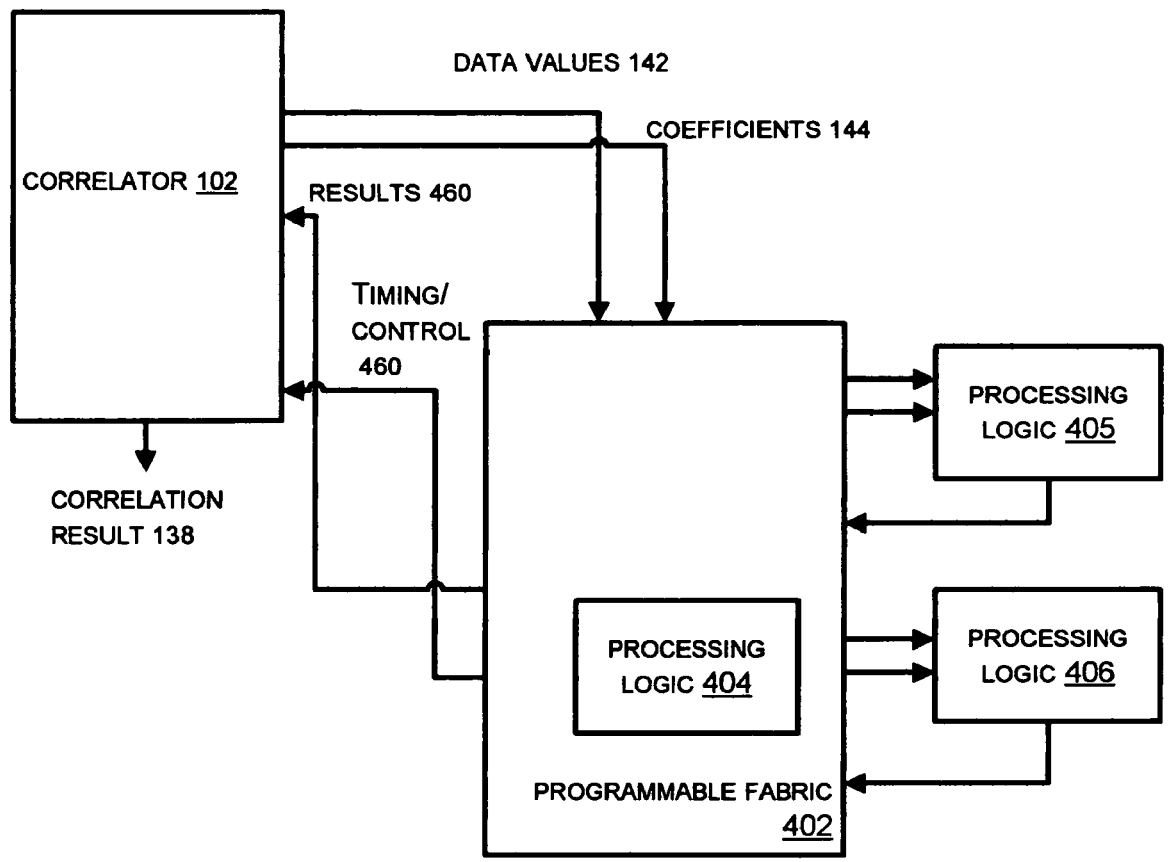
FIG. 4 is a block diagram of an embodiment of an apparatus including a correlator, programmable fabric, and selectable correlator processing logic.

Circuit Including Correlator, Programmable Fabric, and Selectable Correlator Processing Logic FIG. 4 is a block diagram of an embodiment of a circuit apparatus including a correlator, programmable fabric, and selectable correlator processing logic.

The correlator 102 communicates with selectable fixed and/or user-defined processing logic 404, 405, 406 via a programmable fabric 402. The programmable fabric 402 provides for user-defined logical operations and/or communication paths between logic blocks.

The circuit may include logic to enable selection of alternate processing logic 405, 406 external to the correlator 102 and to enable application of data 118 and corresponding coefficients 120 of the correlator 102 to the external processing logic 405, 406. In some implementations the alternate processing logic may be logic configurable from a programmable fabric 402. The alternate processing logic may alternatively and/or additionally involve fixed processing logic 405, 406 having inputs and outputs accessible via the programmable fabric 402. The fabric 402 may provide communication of data and coefficient values to and results from selected fixed process processing logic 405 and/or 406.

The circuit may include and/or involve logic to enable application of corresponding data 118 and coefficients 120 to default processing logic of the correlator 102 if default processing is selected, and to alternate/user-defined processing logic if alternate processing is selected.

Data 118 and corresponding coefficients 120 may be routed via the programmable fabric 402 to selected alternate processing logic. The fabric 402 may also be employed to route results 460 of applying the alternate processing back to the correlator 102.

The correlator 102 may produce a correlation result 138 by accumulating results 460 of applying either the default processing logic or the alternate processing logic, as the implementation may dictate. The adder 112 and/or accumulator 114 logic may accommodate variable, selectable and/or configurable input widths in order to cooperate with a wide range of alternate processing logic.

The circuit may include and/or involve logic to cause selected alternate processing logic to become part of a processing pipeline of the correlator 102, for example by delaying advancement of the correlator pipeline until results are received from the alternate processing logic.

In some implementations various other elements of the correlator may also be selectable and/or configurable. For example, in some implementations one or more of the aligner and features of the summation logic may be selectable and/or configurable.

Those having skill in the art will appreciate that there are various vehicles by which processes and/or systems described herein can be effected (e.g., hardware, software, and/or firmware), and that the preferred vehicle will vary with the context in which the processes are deployed. For example, if an implementer determines that speed and accuracy are paramount, the implementer may opt for a hardware and/or firmware vehicle; alternatively, if flexibility is paramount, the implementer may opt for a solely software implementation; or, yet again alternatively, the implementer may opt for some combination of hardware, software, and/or firmware. Hence, there are several possible vehicles by which the processes described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations may involve optically-oriented hardware, software, and or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood as notorious by those within the art that each function and/or operation within such block diagrams, flowcharts, or examples can be implemented, individually and/or collectively, by a wide range of hardware, software, firmware, or virtually any combination thereof Several portions of the subject matter subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in standard integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies equally regardless of the particular type of signal bearing media used to actually carry out the distribution. Examples of a signal bearing media include, but are not limited to, the following: recordable type media such as floppy disks, hard disk drives, CD ROMs, digital tape, and computer memory; and transmission type media such as digital and analog communication links using TDM or IP based communication links (e.g., packet links).

In a general sense, those skilled in the art will recognize that the various aspects described herein which can be implemented, individually and/or collectively, by a wide range of hardware, software, firmware, or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), and/or electrical circuitry forming a communications device (e.g., a modem, communications switch, or optical-electrical equipment).

Those skilled in the art will recognize that it is common within the art to describe devices and/or processes in the fashion set forth herein, and thereafter use standard engineering practices to integrate such described devices and/or processes into larger systems. That is, at least a portion of the devices and/or processes described herein can be integrated into a network processing system via a reasonable amount of experimentation.

The foregoing described aspects depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality.

What is claimed is:

1. A correlator circuit comprising:
   tap memory for receiving data values;
   coefficient memory for receiving coefficients;
   default processing logic for multiplying the data values and corresponding coefficients in a default correlation manner;
   alternate processing logic for operating on the data values and coefficients in a non-default correlation manner, the logic including
      a lookup table in which is stored a second set of data values, the data values received in the tap memory serving as addresses to the lookup table; and
      a multiplier for multiplying a data value of the second set and a coefficient received from the coefficient memory, the data value of the second set and the coefficient corresponding to a data value from the tap memory addressing the lookup table; and
   selection logic for selecting between the default processing logic and the alternate processing logic.

2. The correlator circuit of claim 1, wherein the lookup table within the alternate processing logic includes a set of weights to be applied to the second set of data values, and the multiplier is adapted to multiply the data value of the second set, the weight to be applied to the data value, and the coefficient received from the coefficient memory.

3. The correlator circuit of claim 1, wherein the circuit is implemented within the programmable fabric of a logic device.

4. The programmable logic device of claim 1, wherein the alternate processing logic includes user-defined processing logic.

5. A computer readable medium on which is stored software which when executed by the programmable fabric of a device creates within the device a correlator circuit comprising:
    tap memory for receiving data values;
    coefficient memory for receiving coefficients;
    default processing logic for multiplying the data values and corresponding coefficients in a default correlation manner;
    alternate processing logic for operating on the data values and coefficients in a non-default correlation manner, the logic including
        a lookup table in which is stored a second set of data values, the data values received in the tap memory serving as addresses to the lookup table; and
        a multiplier for multiplying a data value of the second set and a coefficient received from the coefficient memory, the data value of the second set and the coefficient corresponding to a data value from the tap memory addressing the lookup table; and
    selection logic for selecting between the default processing logic and the alternate processing logic.

6. The computer readable medium of claim 5, wherein the lookup table within the alternate processing logic includes a set of weights to be applied to the second set of data values, and the multiplier is adapted to multiply the data value of the second set, the weight to be applied to the data value, and the coefficient received from the coefficient memory.

7. The computer readable medium of claim 5, wherein the circuit is implemented within the programmable fabric of a logic device.

8. The computer readable medium of claim 5, wherein the alternate processing logic includes user-defined processing logic.

* * * * *

UNITED STATES PATENT AND TRADEMARK OFFICE
CERTIFICATE OF CORRECTION

PATENT NO. : 7,606,851 B2  Page 1 of 1
APPLICATION NO. : 11/202149
DATED : October 20, 2009
INVENTOR(S) : Pierce et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1078 days.

Signed and Sealed this

Twelfth Day of October, 2010

David J. Kappos
*Director of the United States Patent and Trademark Office*